United States Patent [19]

Burden

[11] 4,257,809
[45] Mar. 24, 1981

[54] MOLYBDENUM MONOCARBIDE-TUNGSTEN MONOCARBIDE SOLID SOLUTIONS

[75] Inventor: Stephen J. Burden, Troy, Mich.

[73] Assignee: General Electric Company, Detroit, Mich.

[21] Appl. No.: 1,185

[22] Filed: Jan. 5, 1979

[51] Int. Cl.³ .................... B22F 1/00; C22C 29/00
[52] U.S. Cl. ........................... 75/203; 75/213; 423/440
[58] Field of Search ............... 75/203, 213; 423/440

[56] References Cited
U.S. PATENT DOCUMENTS

| | | | |
|---|---|---|---|
| 4,066,451 | 1/1978 | Rudy | 75/240 |
| 4,101,318 | 7/1978 | Rudy | 75/24 |
| 4,139,374 | 2/1979 | Yih et al. | 75/204 |

*Primary Examiner*—Brooks H. Hunt
*Attorney, Agent, or Firm*—Morgan, Finnegan, Pine, Foley & Lee

[57] ABSTRACT

A process for forming a WC-Mo C solid solution alloy starts by first intensely milling, such as dry attritor milling, Mo and W metal powders, followed by a homogenization heat treatment of about 1400° to 1500° C. to form an Mo-W solid solution alloy. The Mo-W solid solution alloy is then crushed to form a fine powder and mixed by ball milling with the appropriate amount of carbon plus cobalt. The milled alloy powder is then heated at approximately 1100° to 1400° C. to form the desired WC-Mo C alloy.

14 Claims, No Drawings

MOLYBDENUM MONOCARBIDE-TUNGSTEN MONOCARBIDE SOLID SOLUTIONS

BACKGROUND OF THE INVENTION

The present invention relates to cemented carbides, formed from molybdenum monocarbide-tungsten monocarbide solid solutions, and specifically, to a new and improved process for forming said solid solutions.

Cemented carbides are well known for their unique combination of hardness, strength and abrasion resistance and are, accordingly, extensively used for such industrial applications as cutting tools, drawing dies, wear parts, and other applications requiring these properties. They are produced by powder metallurgy techniques involving the liquid phase sintering of one or more refractory carbides of Groups IV, V and VI of the Periodic Table with one or more of the iron group metals. The iron group metal exists as a matrix or binder in the sintered alloy and acts to bond or cement the refractory carbide particles together.

Tungsten carbide (WC) compositions, the tungsten carbide, having a hexagonal crystal structure, has been preferred by those skilled in the art because of their high strength and good abrasion resistance. Unfortunately, however, tungsten is a relatively rare metal, and thus, the use thereof in a tool greatly increases the cost of the tool. Accordingly, it has become desirable to substitute another less expensive metal for tungsten, while still maintaining the high abrasion resistance and toughness exhibited by tungsten carbide.

One metal which has been contemplated as a viable substitute for tungsten is molybdenum. Such a substitute has been suggested for several reasons. First, molybdenum is adjacent tungsten in the Periodic Table, and sometimes forms compounds with other elements which are analogous to similar tungsten compounds and which have similar physical properties. Second, molybdenum is a relatively abundant and inexpensive metal.

Numerous attempts have been made to synthesize the molybdenum carbide (Mo C) analog to tungsten carbide (WC), but for the most part, these attempts have failed to yield homogeneous and defined products so that until fairly recently, even the existence of the hexagonal molybdenum monocarbide remained in question. It is known that WC and Mo C form a series of continuous solid solutions based upon the WC hexagonal crystal lattice and efforts have been made to stabilize Mo C by the addition of WC. However, the difficulty in preparing single phase monocarbides, and the experienced instability of the solid solutions in the presence of cobalt at temperatures in the range of 1350° to 1500° C. has discouraged attempts to fabricate cemented carbides containing Mo C. Until fairly recently, it was accepted in the prior art that not more than 1-2 percent of the tungsten in WC could be exchanged with molybdenum, and that the solid solution (Mo,W)C or Mo C did not exist in the desired temperature range of 1200° to 1900° C.

It has now been found that Mo C and single phased (Mo,W)C solid solutions having greater than 1-2 percent Mo can be prepared under certain conditions. Such a teaching is disclosed in U.S. Pat. No. 4,049,380 to Yih et al., issued Sept. 20, 1977, and entitled "Cemented Carbides Containing Hexagonal Molybdenum". Said reference, the teachings of which are incorporated herein by reference, discloses that Mo C or the solid solution (Mo,W)C may be prepared by heating a blended mixture of the desired gross components, which may be powdered molybdenum and tungsten metal and graphite, or a mixture of $Mo_2C$, WC and graphite in the presence of approximately 0.5 to 1.0 percent by weight of nickel or cobalt to a temperature at which nucleation of the hexagonal Mo C phase begins. More particularly, the reference teaches first forming the cubic solid solutions $(Mo,W)_3C_2$ or $(Mo,W)C_{1-x}$ by heating the desired composition to temperatures in excess of 1700° C., preferably in excess of 2000° C. and then to lower the temperature to within the stability domain of the hexagonal Mo C or (Mo,W)C solid solution, and holding at this temperature for several hours until the formation of the monocarbide is complete.

It is an object of the present invention to provide a new and improved process for forming molybdenum monocarbide-tungsten monocarbide solid solutions, and specifically, to provide such a process which can be performed at temperatures significantly lower than the 1700°-2000° C. and excess temperature required in the prior art.

SUMMARY OF THE INVENTION

In accordance with the above-recited objectives, the present invention provides a new and improved process for forming a (Mo,W)C solid solution. Briefly, the subject process begins with the step of intensely milling molybdenum and tungsten metal powders, followed by a homogenization heat treatment to form a solid solution Mo-W metal alloy. The heat treatment is conducted at a temperature of above 1000°, preferably in the range of approximately 1400°-1500° C. The Mo-W alloy is then crushed into powder and thoroughly mixed with carbon and preferably 0.5 to 1.0 weight percent iron, cobalt, or nickel. The Mo-W carbon (iron, cobalt or nickel) mixture is then heated to a temperature in a range of approximately 1100° to 1400° C., preferably, 1200° to 1300° C., thus forming the desired (Mo,W)C alloy carbide.

DETAILED DESCRIPTION OF THE PREFERRED EMBODIMENTS

The present invention provides a new and improved process for forming single phase solid solutions of (Mo,W)C, and represents a significant improvement over the prior art processes in that, inter alia, it is carried out at substantially lower temperatures than said known processes. The subject process can be used to prepare solid solution alloys that span virtually the compositional limits, extending from pure WC to about WC-83.0 weight percent Mo C.

In accordance with the present invention, the first step of the subject process comprises the step of intensely milling molybdenum and tungsten metal powders. Preferably, the milling is a dry milling performed in an attritor having 50 kg of MC-Co balls. In addition, it is preferable that the milling be conducted for a period of approximately 30 hours at approximately 300 rpm. The milled molybdenum and tungsten metal powders are then given a homogenization heat treatment to form a friable solid solution molybdenum-tungsten alloy. More particularly, the milled molybdenum and tungsten metal powders are heated to a temperature above 1000° C., preferably in the range of approximately 1400° to 1500° C., and most preferably, approximately 1450° C. for a period of about six hours to form a powder cake. X-ray diffraction line-broadening techniques show that the reacted product is a true solid solution alloy of molybdenum and tungsten. The powder cake is then crushed to a fine powder, preferably at least −35 mesh. The next step in the subject process is to thoroughly mix the crushed molybdenum-tungsten alloy powder, preferably by ball milling or attritor milling, for a period on the order of approximately six hours, with the stoichiometric amount of carbon of the carbide to be formed, and preferably though not necessarily, with 0.5 to 1.0 weight percent iron, cobalt or nickel. The molybdenum-tungsten carbon (iron, cobalt, or nickel) mixture is then heated to a temperature in the range of approximately 1100° to 1400° C., preferably, 1200° to 1300° C. for a period on the order of approximately eight hours. The powder cake thus formed is the desired molybdenum monocarbide-tungsten monocarbide solid solution, which can be easily crushed to the fine powder necessary for the production of hard metal alloy.

For the purpose of better explaining the improved process of the subject invention, reference is made to the following examples.

EXAMPLE 1

In order to prepare a solid solution alloy of Mo C-20 mole percent WC (31.2 weight percent WC) 8,112 grams of molybdenum powder and 3,888 grams of tungsten powder were dry attritor milled with about 50 kg of WC-Co balls for a period of 30 hours at 300 rpm. The milled powder was then placed in molybdenum boats and heated to 1450° C. in one atmosphere of hydrogen for about six hours. X-ray diffraction line-broadening techniques show that the reacted powder cake formed is a true solid solution alloy of tungsten and molybdenum, specifically, an Mo-20 mole percent W (32.4 weight percent W) alloy. The powder cake was then crushed to fine powder, preferably at least −35 mesh, 5,424 grams of the above Mo-20 mole percent W alloy powder, 576 grams carbon and 60 grams cobalt were then wet-ball-milled for a period of six hours to thoroughly mix the components. The ball-milled slurry was then dried, screened, and put into graphite boats. The resulting powder was heated to about 1250° C. in a hydrogen atmosphere for about eight hours. The powder cake thus formed is the desired Mo C-20 mole percent WC alloy and can be easily crushed to the fine powder necessary for the production of hard metal alloy.

EXAMPLE 2

It will be noted that if it were desired to form the subcarbide solid solution alloy $(Mo,W)_2C$, this could easily be done with the Mo-W solid solution alloy powder formed in Example 1. More particularly, after a Mo-W solid solution alloy powder has been formed in accordance with the steps of Example 1, said alloy may be mixed with 33.3 atomic percent (5.0 weight percent) carbon, preferably by ball milling about six hours. The milled mixture is then heated in an atmosphere of hydrogen at a temperature of approximately 1100° to 1400° C., preferably 1200° to 1300° C., and most preferably, at about 1250° C. thus forming the desired $Mo_2C$-20 mole percent $W_2C$ solid solution alloy.

In summary, the subject invention provides a new and improved process for forming a WC-Mo C solid solution alloy. Whereas prior art processes require the application of undesirably high temperatures typically in excess of 2000° C., the subject process employs temperatures substantially lower than 2000° C., the maximum temperature contemplated in the subject process being on the order of only 1500° C., and preferably, no higher than 1450° C.

While there have been described herein what are at present considered preferred embodiments of the invention, it will be obvious to those skilled in the art that many modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalency of the claims are intended to be included therein.

What is claimed is:

1. A process for forming a WC-MoC solid solution alloy comprising the steps of:
   (a) intensely milling Mo and W metal powders;
   (b) applying a homogenization heat treatment in the range of approximately 1000° to 1500° C. to said milled Mo and W metal powders thus forming a Mo-W solid solution alloy;
   (c) crushing the Mo-W solid solution alloy to a fine powder;
   (d) mixing the crushed Mo-W solid solution alloy powder with the stoichiometric amount of carbon of the carbide to be formed; and
   (e) heating the mixture of step (d) at approximately 1100° to 1450° C. to form the desired WC-Mo C. alloy.

2. A process as recited in claim 1 in which the milling in step (a) is a dry attritor milling.

3. A process as recited in claim 1 in which the milling in step (a) is a dry ball milling.

4. A process as recited in claim 1 in which the homogenization heat treatment is performed at approximately 1450° C.

5. A process as recited in claim 1 in which the thorough mixing in step (d) is done by ball milling.

6. A process as recited in claim 1 in which the thorough mixing in step (d) is done by attritor milling.

7. A process as recited in claim 1 in which 0.5 to 1.0 weight percent of a metal selected from the group consisting of iron, cobalt and nickel is mixed with the crushed Mo-W solid solution alloy powder and carbon in step (d).

8. A process as recited in claim 7 in which the metal which is mixed with the crushed Mo-W solid solution alloy powder and carbon in step (d) is iron.

9. A process as recited in claim 7 in which the metal which is mixed with the crushed Mo-W solid solution alloy powder and carbon in step (d) is cobalt.

10. A process as recited in claim 7 in which the metal which is mixed with the crushed Mo-W solid solution alloy powder and carbon in step (d) is nickel.

11. A process as recited in claim 1 in which the heating in step (e) is performed at a temperature in the range of approximately 1200° to 1300° C.

12. A process as recited in claim 1 in which the mixing in step (d) comprises the mixing of 50 atomic percent Mo-W solid solution alloy with 50 atomic percent carbon.

13. A process for forming a MC-Mo C solid solution alloy comprising the steps of:
   (a) intensely dry attritor milling of Mo and W metal powders;

(b) applying a homogenization heat treatment of approximately 1450° C. to said milled Mo and W metal powders thus forming a Mo-W solid solution alloy;

(c) crushing the Mo-W solid solution alloy to a fine powder of about −35 mesh;

(d) thoroughly mixing by attritor milling, the crushed Mo-W solid solution alloy powder with the stoichiometric amount of carbon of the carbide to be formed and 0.5 to 1.0 weight percent of a metal selected from the group consisting of iron, cobalt and nickel; and (e) heating the mixture of step (d) at a temperature in the range of approximately 1200° to 1300° C. to form the desired WC-Mo C alloy.

14. A process for forming a Mo C-20 mole percent WC(31.2 weight percent WC) solid solution alloy comprising the steps of:

(a) dry attritor milling 8,112 grams of Mo metal powder and 3,888 grams of W metal powder for a period of about 30 hours at 300 rpm;

(b) placing the milled Mo and W metal powders in Mo boats;

(c) heating the milled Mo and W metal powders at a temperature of approximately 1450° C. in an atmosphere of hydrogen for about six hours to form a Mo-20 mole percent W solid solution alloy;

(d) crushing the Mo-20 mole percent W solid solution alloy to a fine powder of about −35 mesh;

(e) thoroughly mixing 5,424 grams of the Mo-20 mole percent W solid solution alloy powder with 576 grams of carbon and 60 grams of cobalt by wet-ball-milling for a period of six hours so as to form a slurry;

(f) drying the slurry formed in step (e) to form a powder;

(g) screening the dried powder of step (f);

(h) placing the screened powder of step (g) into graphite boats; and (i) heating the powder of step (h) to about 1250° in hydrogen for about eight hours.

* * * * *

UNITED STATES PATENT AND TRADEMARK OFFICE
CERTIFICATE OF CORRECTION

PATENT NO. : 4,257,809
DATED : March 24, 1981
INVENTOR(S) : Stephen J. Burden

It is certified that error appears in the above—identified patent and that said Letters Patent is hereby corrected as shown below:

Column 2, line 18, change "monocarbidetungsten" to
-- monocarbide-tungsten --;

Claim 13, line 1 change "MC-Mo C" to -- WC-Mo C --.

Signed and Sealed this

Second Day of June 1981

[SEAL]

Attest:

RENE D. TEGTMEYER

*Attesting Officer*  *Acting Commissioner of Patents and Trademarks*